3,427,948
COPYING DEVICE
Walter Limberger, Hamburg, Poppenbuttel, Germany, assignor to Lumoprint Zindler KG., Hamburg, Germany
Filed Apr. 19, 1966, Ser. No. 543,593
Claims priority, application Germany, Apr. 23, 1965, L 50,549
U.S. Cl. 355—12                14 Claims
Int. Cl. G03b 27/04, 27/08, 21/00

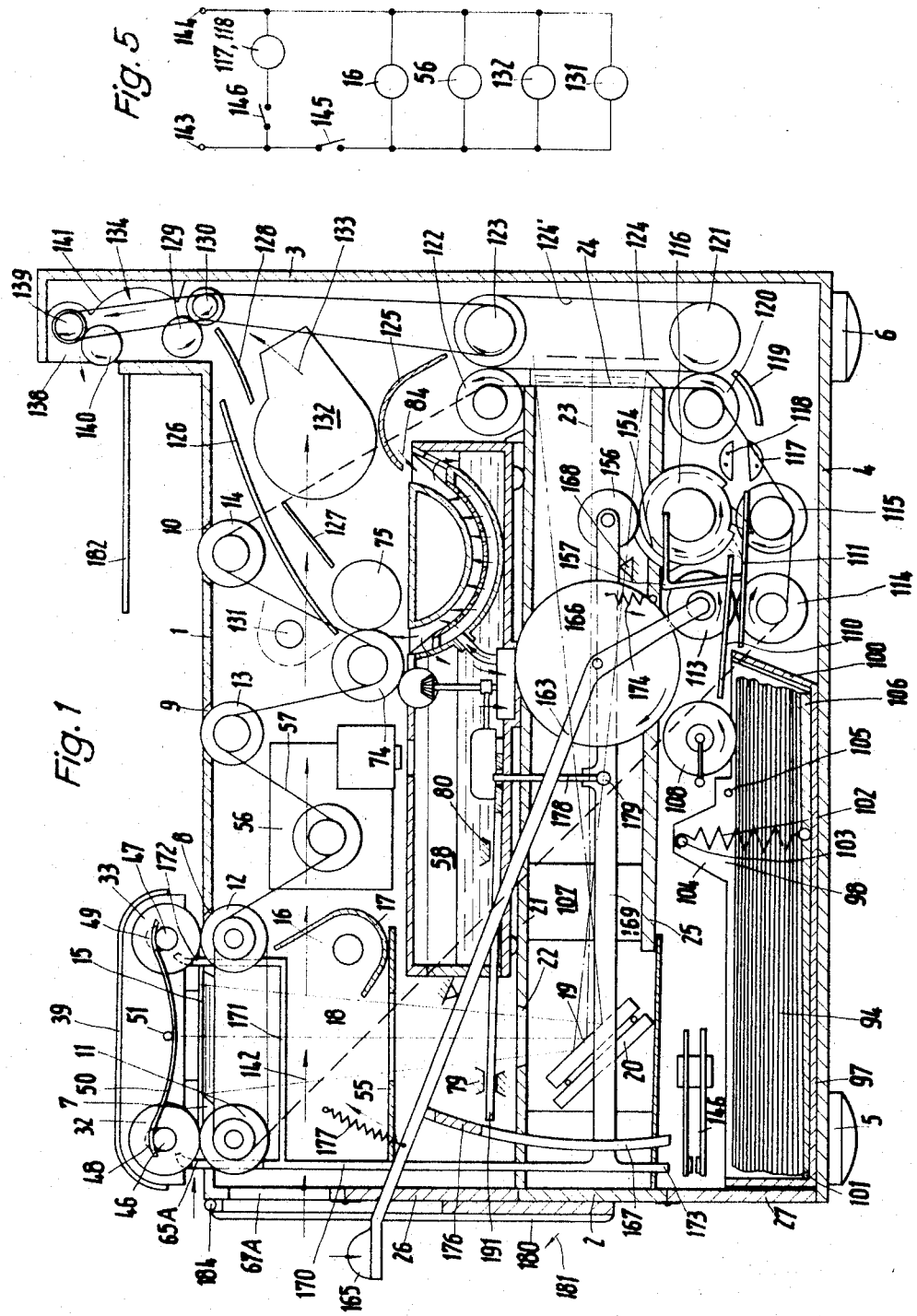

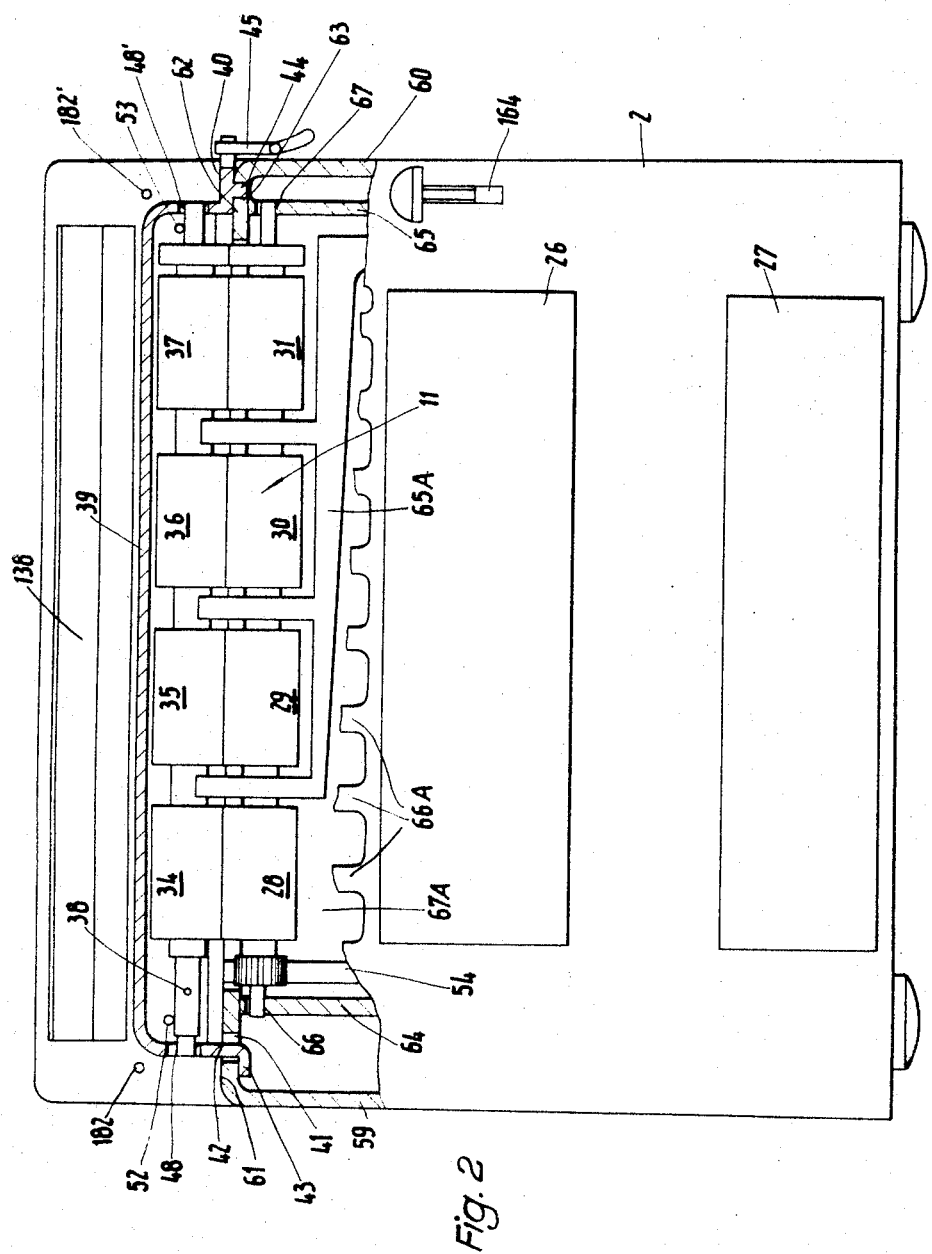

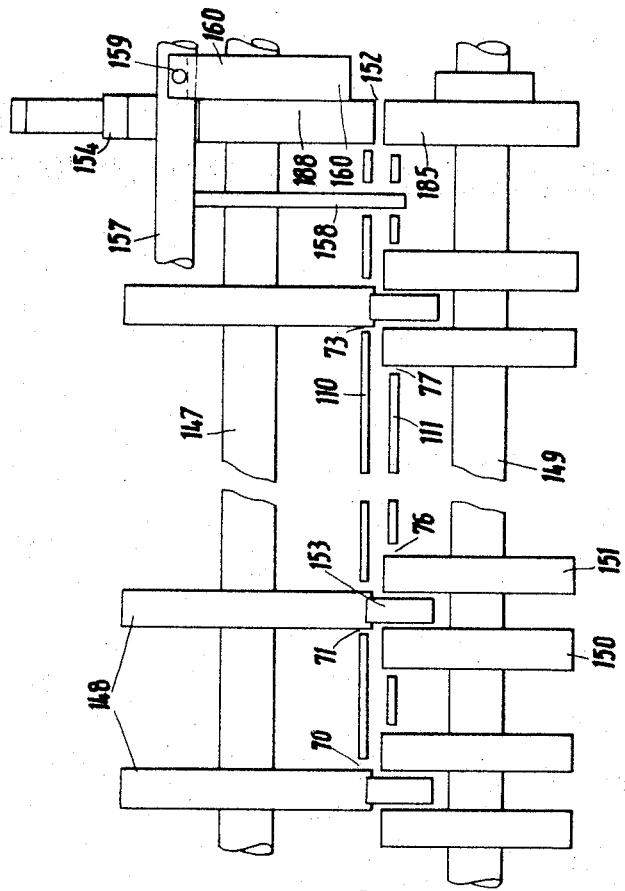
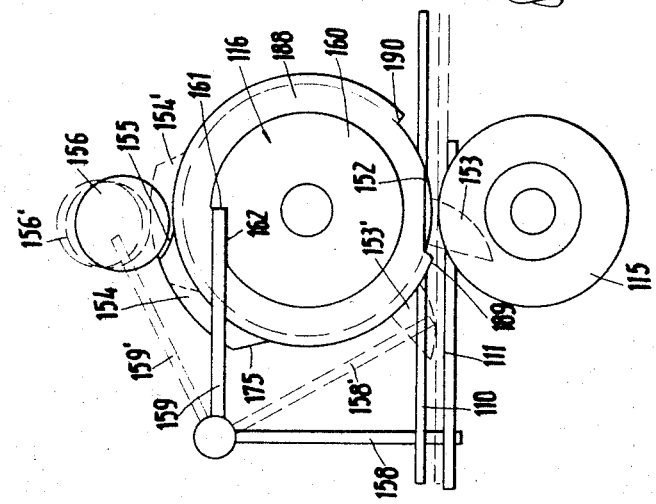

ABSTRACT OF THE DISCLOSURE

Apparatus for manufacturing copies employing the electrophotographic method in which individual sheets of copying material are transported along a path containing charging means, exposing means and developing means. For controlling operation of the apparatus, a control cam roller is provided in combination with the transport rollers for selectively operating the copying cycle within the apparatus.

---

The invention relates to a device for manufacturing copies, comprising an exposure device, a developing device and a sheet feeder, combined with an apparatus control.

The exposure device may comprise a transparent plate for the original and a transparent plate for the copying material to be exposed, with at least one light source, an objective and a deflecting mirror as well as the exposure plate arranged thereinbetween on the upper side of the housing.

More particularly, the invention relates to an automatic machine for making copies, using the electrophotographic method.

It is already known to feed, expose and develop sheets of copying material according to the electrophotographic method, wherein the developing particles applied thereto, for example, pigments retained by electrostatic forces, are burned in, in order to fix the picture.

It is one object of the invention to provide an automatic device which substantially facilitates the manufacture of copies of this kind. The improvement relates more particularly to a novel control for the device.

It is a further object of the invention to provide a new control for the copying apparatus which requires less space than known controls and which does not strain the copying material passing through the device when it is actuated thereby.

It is yet another object of the invention to provide a novel control which facilitates the operation of the device and avoids faulty operation thereof.

It is a further object of the invention to provide a control for an automatic copying machine, operating wtih mechanical means and enabling several functions to be performed by operating a single key.

These and other objects are realized according to the invention by a control mechanism for a copying device, comprising a control cam roller, adapted to be releasably locked in one direction by locking means actuated by the advancing copying material, and in the other direction by a peripheral cam, and mounted easily rotatably on one side of a guide track for the copying paper to be inserted, and associated on its other side with a counterroller, wherein the said peripheral cam is provided on a part of the periphery which projects from a recess or flat of the cam roller and engages into slots of the counterroller, and is adapted to be moved thereby. The object of the recess or flat in combination with the follower cam is as follows: the control cam roller is so dimensioned that it engages drivingly with the driven counterroller outside the zone of the recess or flat. When the cam is located within the zone of the guide track or transport track, the said recess or flat prevent such driving engagement. However, when the follower cam is moved by the leading edge of the copying paper so that it is moved out of the guide track or transport track, this driving engagement is restored and the further action becomes effective for controlling the apparatus by the direct engagement between the control cam roller and the counterroller, i.e., the sheet of copying paper is relieved from having to carry out the control tasks itself. In practice, this results in a power amplification in that the sheet of copying paper only has to produce an initial or trigger impulse whilst the control cam roller is relieved, whilst the actual control movement is transmitted to the drive of the machine by the counterroller. The length of the recess or flat is such that the driving engagement with the counterroller is suspended when the control cam roller with the control cam have rotated through less than 360° so that the cam rests on the facing sides of the copying material. Moreover, the control is so designed that it carries out its object during this rotation of the control cam through less than 360°.

Conveniently, the peripheral cam is angularly offset relative to the follower cam through about 150°. This peripheral cam is associated with a locking roller arranged, according to a further feature of the invention, on a lever, adapted to be moved by means of the control cam roller by a key projecting from the housing so as to left the locking roller.

Obviously, the said key can be associated with a drive wheel which engages a transport roller on the paper stack when the key is actuated, causing the topmost sheet to be moved between a pair of transport rollers, resiliently pressed on to each other and arranged in the guide track upstream of the control cam roller.

According to another feature of the invention, the key is equipped with a contact arm for operating a switch whereby a charging device arranged in the housing may be actuated when electrophotographic material is used. By correlating the switching on of the charging device by the key, an accurate timing of the operation of the apparatus may be achieved. According to another feature of the invention, the crank lever forms, on the one hand, a locking mechanism on the exposure plate, with arms movable in height in front and behind the exposure plate so as to block or open the passage, and on the other hand, the said crank lever has an actuating member for the switch of the charging device so as to hold the same in the switched on state whilst copying material passes the control cam roller. Thus, operation of the device is assured even after the actuating key has been released.

According to yet another feature, and in order to achieve a specific function of the apparatus, the said lever, preferably a crank lever, is connected by a resilient element, such as a steel wire, with a displaceable locking bar, in such a manner that it moves this bar after the release of the key into a recess thereof so long as copying material continues to move past the control cam roller. In order to assure trouble-free operation, the locking roller on the crank lever is offset against the control cam roller, relative to the vertical plane passing through the axis thereof, in the direction against the flow of the copying material, so as to exert a torque on the peripheral cam, whereby the control cam roller continues to turn until it reaches its starting position, after the copying material has run through the machine.

It is relevant for the object of the invention that the peripheral length of the control cam roller is so dimensioned that, between the instant of engagement between the copying material and the follower cam and the position in which the locking roller is lifted and the exposure plate is released, the copying material advances to the guide face.

More particularly, the invention provides an automatic machine for the electrophotographic manufacture of copies, equipped, in addition to a novel support for the original, also with a release actuatable by manual pressure on a key, whereby sheets of copying material are introduced, the charging device is switched on, and at the same time, after a suitable lapse of time, the guide of the original over the exposure plate is released, whilst a locking device is so controlled that it prevents a second operation of the key before the copy has passed through a part of its functional travel. Thus several copies can be made in quick succession and a second copy can be started before the copying material of the first copy has left the machine.

The terms "rollers," "transport rollers" and the like, include their construction as so-called disk rollers, having the form of several coaxial disks arranged on the same shaft, wherein the said disks may be formed in special cases with roller-like portions, or in other cases in offset arrangement so as to form alternatively interengaging elements.

The invention will be further described with reference to embodiments shown in the accompanying drawings, showing merely diagrammatically the functional items insofar as these are necessary for the ensuing explanation of the present invention.

In the said drawings:

FIG. 1 is a side elevation of a device according to the invention, shown in cross section along different planes, showing only the parts necessary for explaining the operation of the device;

FIG. 2 is an end-wise elevation of the device, indicating special feature of the exposure mechanism thereof;

FIG. 3 shows on an enlarged scale in side elevation the control cam roller of FIG. 1 with the crank lever in different positions, together with a part of the guide track on which the said control cam roller is arranged;

FIG. 4 is a partial side elevation of the control cam roller, rotated through 90 degrees, together with the counterroller associated with the control cam roller on the guide track;

FIG. 5 shows diagrammatically a circuit diagram of the main circuits of the device.

FIG. 1 shows the entire device. It should be stressed that the levers of the control mechanism are arranged in another plane parallel to the plane of the drawing than, for example, the spaces in which the copying material is guided.

The automatic device according to the invention has a housing, comprising an upper surface 1, a front 2, a rear wall 3, a bottom plate 4, which may be equipped with legs 5 and 6. The upper surface 1 has holes 7, 8, 9, 10 therein, through which project guide rollers 11, 12, 13, 14 mounted in side walls of the housing, extending parallel to the plane of the drawing; these guide rollers protrude beyond the said upper surface 1 with a peripheral section, amounting for example, to 1 or 2 millimetres.

Between the said holes 7, 8, and the guide rollers 11, 12, the upper surface is equipped with a transparent exposure plate 15, having a width at least equal to that of the copying material to be processed, and over which an original to be copied is guided.

The exposure plate is irradiated from below by at least one light source 16 arranged within the housing, for example by a tubular lamp, arranged in a reflector 17 which directs the radiation towards the exposure plate 15, but is located outside the picture beam, indicated by a dash-dot line 18. This beam impinges on a deflecting mirror 19, arranged, for example, on a three-point suspension on a plate 20 fixed in the housing. The beam passes via the mirror 19 through an intermediate partition 21, having an orifice 22; this orifice has a width corresponding to the picture beam. Behind the mirror 19, there is an objective lens 107.

The exposure beam has an L-shaped configuration and passes along a horizontal path 23 to a guide surface 24, which is also transparent in the same way as the exposure plate 15. The susbtantially vertically located guide surface 24 defines a channel with the upper wall 21 and the lower wall 25. These walls define between themselves the horizontal section of the L-shaped exposure beam towards the top and bottom between wall portions of the housing, extending parallel to the plane of the drawing and mounted on the housing walls. In addition, the guide surface 24 defines also a section of a transport path for the copying material, passing through the housing and described more fully further below.

FIG. 2 shows an end-wise view of the housing, viewed in the direction of the end wall 2. As may be seen, two flaps 26, 27 are provided in the front wall of the housing; the purpose of these flaps will become apparent from the following description. Moreover, the guide roller 11 is shown to consist of several roller sections 28, 29, 30, 31. The counterrollers 32, 33 (FIG. 1) arranged above the guide rollers 11, 12, consist, as shown in FIG. 2, of corresponding sections 34, 35, 36, 37, arranged on a common shaft 38; this shaft is mounted on a housing-shaped frame 39. The said housing-shaped frame may be mounted, for example, on the upper surface 1 of the main housing, by means of a pivotable locking device 40. For example, the main housing may have a hole 41, through which a lateral edge 42 of the housing-shaped frame 39 may be inserted and anchored by means of an angle 43. The other side of the frame engages with a projection 44 into a recess in the upper surface and is additionally equipped with a locking device 45 for effecting the mounting by means of a pivotal movement.

As may be seen from FIG. 1, the counterrollers 32, 33 are mounted with spindles 46, 47, vertically movable in oblong holes 48, 49 of the frame, and are biased by at least one spring 50, passing with its centre underneath an abutment 51 and pressing with ends against the upper surfaces of the said spindles 46, 47. The front ends of these springs are shown in FIG. 2 at 52, 53, and the oblong holes at 48, 48'.

FIG. 2 shows further the lower roller 11 with the sections 28 through 31, with a driving arrangement by means of a gearing 54, although a pulley drive as shown in FIG. 1 may also be used. FIG. 2 presents therefore a modification.

The upper zone of the housing forms a space above a shutter plane 55, shown only in part, with a motor 56 arranged thereabove, adapted to drive the revolving parts of the apparatus by means of a cable drive.

The developing section 58 is located underneath this part 55.

Under the partition 25 is a chamber, accessible through a flap 27, containing a drawer-shaped container with a stack 94 of sheets of copying material.

The housing construction of the apparatus is also shown in FIG. 2. In addition to the end walls 2, 3 in FIG. 1, the housing has side walls 59, 60, bent inwardly on the top as at 61, 62, to form the upper wall. The angled portions contain the hole 41 and the recess 63 for the projections 44, said hole and recess being slot-shaped and adapted in length to the frame 39.

Within the side walls 59, 60, there are arranged, parallel thereto, so-called assembly walls 64, 65, containing the necessary bearings, such as, for example, bearing points 66, 67 for the stub axles of the guide roller 11. The figure also shows another part, the so-called grid 65A, the object of which is described further below and an air inlet 67A with webs 66A passing therethrough.

With the exception of the driving means, the parts described so far are mounted between and on the assembly walls 65, 64. Driving means may be arranged to pass through these assembly walls so that linkages and parts of levers may be arranged between the outer walls 59, 60 on the one hand, and the assembly walls 65, 64, on the other hand, as hereinafter described (see FIG. 2).

A slide bar for the paper stack 94, accessible after opening the flap 27, is also located between the assembly walls.

The stack 94 rests on a support plate 106, articulated to the base plate 97 by means of a joint 101. Near its front end, the support plate is affected by springs, such as 102, located on either side of the stack. The upper ends of the said springs are mounted in an abutment 103 located on a lug 104 of a side wall 98 on the base plate 97. The side walls of the stack are also interconnected by a bar-shaped abutment 105, against which the top sheet is pressed when the arrangement is outside the housing.

Several rollers are mounted in the assembly walls. Above the inserted stack 94 and near its end, located substantially in the centre of the housing, there is an intermittently actuable delivery roller 108, mounted freely rotatably and acting on the topmost sheet of the stack. As may be seen from the drawing, the lower peripheral section of this roller is somewhat below the abutment 105.

Downstream of the storage mechanism 94, 97, 98, 100, 106, 102, 104, just described, there is a transport section, defined on the top and bottom by perforated guide faces 110 and 111. Disk-shaped portions of rollers 113, 114, 115 project into these perforations. The said rollers 113, 114, 115, rotatably mounted in the assembly walls, are continuously driven, for example, by a cable drive 57, in the direction indicated by the arrows, after the apparatus has been switched on.

The rollers 113, 114 run adjacently. The roller 115 is associated with a control cam roller 116, mounted easily rotatably between the assembly walls, and described in detail below with reference to FIGS. 3 and 4. The guide section formed between these parts extends through a charging device 117, 118 in the assembly walls, equipped with corona discharge wires. The guide track is then reversed by the curved guide face 119 towards a pair of transport rollers 120, 121, driven in the direction of the arrows, for example by means of a belt drive 57. This pair of transport rollers is in front of the lower end of the guide surface 24. A pair of transport rollers 122, 123, driven in the direction indicated by the arrows, is arranged on the upper end of this guide face. A guide member 124 may extend between the rollers 121, 123, which may be biased by spring pressure towards the guide surface 24. Preferably, an endless belt 124' extends over the rollers 121, 123, having a section running along the guide surface 24 so as to guide copying material under contact pressure along the same.

Above the contact zone between the rollers 122, 123, there is another curved guide member 125 for guiding the sheet of copying material towards the inlet of the developing section 58, as indicated by the arrow 84. Above the outlet of the developing section are rollers 74, 75, and the transport section extends from above these rollers between guide members 126, 127, 128 to driven pairs of rollers 129, 130. The said guide member 126, and preferably all the other guide members have perforations. They may consist of strips, wires or perforated plates. A heating radiator 131 is arranged above the guide element 126, for example within a reflector, or with a certain direction of radiation, so that the guide section is heated.

Within the zone of the guide members 127, 128 a fan 132 is arranged between the assembly walls, delivering drying air obliquely upwardly, as indicated by the arrow 133. In the zone of and above the rollers 129, 130, the whole housing has a chimney-shaped projection 134 with a delivery orifice 138, directed towards the left side. Transport rollers 139, 140, driven in the sense indicated by the arrows, are mounted in front of this delivery orifice. Between the said pairs of transport rollers 129, 130 and 139, 140, respectively, there are preferably guide members 141 in the form of webs or wires, located in a vertical plane, permitting an airflow in the vertical direction and guiding the copying material towards the rollers 139, 140.

In the same manner as other rollers in the apparatus, also the rollers 129, 130, 139, 140 are preferably disk-type rollers, permitting air to pass therethrough.

Also here, the described parts of the transport section, namely the guide faces 110, 111, the rollers 113 through 116, the charging device 117, 118, the guide face 119, the pairs of transport rollers 120 through 123, the guide members 124, 125, the developing section 58, the guide members 126, 127, 128, the pair of rollers 129, 130, the radiating heater 131, the fan 132, are always mounted firmly or rotatably in side or assembly walls of the housing.

Furthermore, a chamber is provided in the upper part of the housing and behind the air inlet 67A, which may be equipped with webs 66A passing therethrough (FIG. 2), containing in front of the radiating heater 131 the parts of the device which tend to radiate heat, namely the light source 16 and the motor 56. Owing to the arrangement of the fan 132 at the end of this chamber, an airflow is produced in the direction of the arrows 142.

Obviously, the device is intended for the processing of electrophotographic materials, and the drawings show only the parts essential for the operation.

FIG. 5 shows diagrammatically the electric circuit. The terminals 143, 144 are connected to several circuits, the parts of which are marked with the same reference numerals as in FIG. 1.

The circuits with the parts 16, 56, 132, 131 are operable by a switch 145, not shown in detail in FIG. 1 when the apparatus is taken into use. The charging device 117, 118 is adapted to be switched on by a separate switch 146, indicated as such in FIG. 1. The electrical connections are shown in FIG. 5.

It may be seen from FIGS. 1, 3 and 4 that the control cam rollers 116 consist of several disks 148, arranged on a shaft 147, mounted in the assembly walls.

Similarly, the mating roller 115 consists of a shaft 149 carrying pairs of disks 150, 151, so arranged that they are adjacent the flanks of a disk 148 in their downward extensions. FIG. 4 shows the perforation 70, 71, 73, 76, 77 of the guide faces 110, 111, through which the rollers pass. The counterroller is equipped, in the zone outside the copying material passing therethrough, with a disk 185, corresponding to the disks 150, 151. The shaft 147 of the control cam rollers 116 carries a control disk 188, spaced from the disk 185 in the position shown in the drawing, because in this position, in which the follower cam 153 on the disks 148 is facing downwardly, the flat 152 is at the bottom. It may be seen from FIG. 3 that, when the flat 152 is not within the zone of the counterroller 115 or of the disk 185 of the counterroller, the periphery of the control disk 188 is in driving engagement with the disk 185.

In this starting position, the flat or recess 152 (FIG. 3) of the control disk 188 is at the bottom. The flat 152 may be seen to extend from a starting point 189 to an end stage 190. The disks 148, mounted rigidly on the shaft 147, carry follower cams 153, extending substantially radially, that is to say, inclined towards the bottom left in the drawing, passing through the guide track defined by the guide members 110, 111 and engaging between the disks 150, 151 of the counterroller 115. In addition thereto, the control cam roller carries on the control disk 188 a peripheral cam 154 (shown top left in FIG. 3), whose left flank 155 forms an abutment for a cam locking roller 156. In its bottom position, this cam locking roller prevents the control cam roller 116 from rotating in a clockwise direction according to FIG. 3.

A rotating rod 157 is rotatably mounted in the assembly walls, and carries two pivoting levers 158, 159, acting together after the manner of a pivotable locking angle.

The said lever 158 extends in the starting position through slots in the guide members 110, 111 and through the guide track.

The other lever 159, extending horizontally towards the control cam roller 116, cooperates with a stepped cam 160 of this roller. In FIG. 3, the stepped surface is on the top and faces leftwards. The end on the said lever 159 is in contact with the flat 162, forming at the same time an abutment preventing an excessive pivotal movement in the clockwise direction, that is to say, a pivoting of the lever 158 to the left out of the guide track. In the FIG. 3 position, the lever 159 and the stepped surface 161 form together a ratchet, preventing the control cam roller 116 from rotating in an anticlockwise direction.

When the copying material is advanced through the guide track, for example, by means of rollers 113, 114, its leading edge makes contact with the pivoting lever 158. This pivoting lever is carried along into the position 158' (shown by dotted lines), causing the pivoting lever 159 to be lifted into the position 159', and the control cam roller to be released for anticlockwise rotation (as viewed in FIG. 3). However, other senses of rotation may, of course, be adopted, in accordance with the practical arrangement.

When the leading edge of the paper makes contact with the follower cam 153, the control cam roller 116 is rotated. The length of the follower cam is such that the recess 152 leaves the zone of the guide track when the follower cam 153 is lifted off the copying material. Apart from the fact that under these conditions the periphery of the control cam roller protrudes sufficiently into the guide track to carry the control cam roller into a position, in which the follower cam is on the copying material as at 153', since the end 189 of the flat 152 reaches the counter-roller or the disk 185, the drive is positively transmitted from the disk 185 to the control disk 188, causing the control cam roller 116 to be carried along automatically, i.e., by means of the drive of the counter-roller 115, so that the stress imposed on the paper is relieved. If the follower cam is in the position 153', the peripheral cam 154 has reached the position 154', whilst the end 175 has moved the locking roller 156 into the position 156'. The peripheral cam 154 retains then the locking roller 156 in the position 156'.

A manual lever 163 is freely rotatably mounted on the shaft of the roller 113; one arm of this lever 163 projects through a slot 164 (FIG. 2) in the front wall of the apparatus and carries an operating key 165 on its end. The said lever is resiliently suspended by means of a spring 177, tending to pull it in an upward direction. The other end of the spring 177 is mounted in the housing. Near its pivoted end, the lever carries a drive disk 166 which is so dimensioned that it runs in conjunction with the driven roller 113 and is rotated thereby. When the key 165 is depressed, the drive disk moves—as viewed in the drawing—in an anticlockwise direction towards the delivery roller 108 and carries the same along, so long as the pressure on the key is maintained. Consequently, the top sheet is removed from the stack 94 and carried to the guide track between the guide members 110, 111. At the same time, an angled projection 167 on the lever 163 closes the switch 146, causing the charging device 117, 118 to be switched on. This device remains in the energized state so long as the key remains depressed.

The key should be depressed until a grid 65A, visible at the inlet of the exposure device in front of the guide rollers 11, 32 (FIGS. 1, 2) is pulled towards the bottom into the housing. This is the case when the peripheral cam 154 of the control cam roller 116 passes under the locking roller 156 and lifts the same.

The locking roller is rotatably mounted on a crank lever 169, which is pivotably mounted on the housing as at 179. This point 179 may be the axis of rotation extending parallel to the side walls of the housing. The crank lever 169 has an upwardly pointing leg 170 on which the front grid 65A is located, which as shown in FIG. 2, blocks the entry between the rollers 32 and 11 and extends through an opening in the upper wall. The leg 170 has a branch 171, extending laterally of the exposure beam, for example, outside the assembly walls, and carries a second grid 172 which blocks the passage through the rollers 12, 33, when the crank lever 169 is in its top position. Also this grid passes through an opening in the top wall. The crank lever 169 has also a further projection 173, operating the switch 146, which is firmly mounted in the housing, when the crank lever is pivoted in an anticlockwise direction.

The crank lever is affected by a spring 174, retaining it resiliently in the position shown and holding the grids 65A and 172 in the blocking position. The spring may be mounted, for example, on the assembly wall or on the partition 25. The position of the crank lever 169 is determined by an abutment 168, against which the lever is pulled by the spring.

The flanks of the peripheral cam 154 (FIG. 3) are so formed that the abutment face 175 reaches during the rotation of the control cam a position underneath the locking roller 156 and lifts the same, causing the crank lever 169 to be pivoted. The other flank is so dimensioned that it forms a locking abutment on the locking roller 156.

When the crank lever 169 is pivoted, the grids, 65, 172 are retracted under the top 1 of the apparatus, releasing the exposure device. At the same time, the lug 173 switches on the switch 146 so that the key can be released, after the movement of the grids has been observed. Owing to the peripheral length of the control cam rollers 116, also the delivery roller 108 can be detached from its driving engagement, since other driving means of the apparatus have taken over the sheet of copying material.

A locking bar 191 is displaceably mounted, for example horizontally, on one side or assembly wall of the main housing. Its bearings are shown in FIG. 1 at 79, 80. The said locking bar may be moved into the path of travel of a lateral lug 176 of the projection 167, engaging under this lug 176 when the pivoting lever 163 has returned to its top position. This serves to lock the apparatus against renewed operation so long as the sheet of copying material is still within the zone of its initial travel through the apparatus, this is to say, within the zone of the control cam roller 116. The said locking bar 191 is displaced by a resilient strap or arm, or an elastic wire 178, fixed to the crank lever 169 near its pivot 179. When the lever is pivoted against the force of the spring, the elastic wire 178 is tensioned and the locking bar is first urged against the projection 176, then lifted when the key 165 is released and engages under this projection. Thus, whilst the locking action or the engagement between the parts 176 and 191 is maintained, the key 165 cannot be depressed. In this manner, individual functional elements are used for several purposes and a mutual safety interlock is provided between the manual actuating member or operating key 165 and a functionally controlled mechanism 116, 169, 170, 173, whereby the manual actuating member can be operated immediately after a certain function has been performed, but is blocked whilst this function is in progress. The retraction of the crank lever 169 by the spring 174, when the control cam roller 116 returns to the FIG. 1 position, causes also the retraction of the locking bar 191 by the wire 178.

According to FIG. 3, the return of the control cam roller is effected in that the locking roller is offset laterally of the vertical passing through the axis of the control cam roller (to the left in FIG. 3). In this way, the locking roller exerts, in the lifted position, under the action of the spring 174 on the crank lever 169, a torque on the control cam roller tending to rotate the same in an anticlockwise direction (FIG. 3). This torque carries along the roller, after the follower cam 153 has been allowed to return into its bottom position after the passage of the sheet of copying material. The spring 174 rests on one side on the crank lever 169 and on the other side in the housing.

Then the locking angle or pivoting levers 158, 159 can return into its starting position after the passage of the sheet of copying material. This return movement from the position 158′, 159′ into the position of FIG. 3 takes place under the own weight of the lever.

In front of the front wall 2 of the housing, a delivery table 180 is hinged along the upper edge of the wall at 184 so that it can be lifted in the direction of the arrow 181. This table, which may be equipped with friction reducing means (such as webs or bars extending in the direction of movement) facilitates the insertion and fitting of the original, such as a book, into the exposure device. In the zone in which the table in its lowered position is in front of the opening 67A, it is equipped with orifices.

Under the delivery orifice 138, there are supporting bars 182 . . . 182′, along which the delivered copying material is pushed forward and between which the sheets can be easily gripped. The bars 182 . . . 182′ are arranged in spaced relationship in a row parallel to the lower edge of the opening 138. FIG. 2 shows only the last bars of this row.

The upper edge of the wall-shaped abutment 100 of the drawer-shaped retainer for the stack 94 is equipped with spaced teeth, preventing the delivery of a second sheet of copying material which adheres detachably under the sheet transported by the roller 108.

I claim:

1. An apparatus for manufacturing copies of an original on a sheet of copying material, comprising a housing and arranged therein an exposure device for exposing the original on to the sheet of copying material, a developing device for developing the exposed picture in the sheet of copying material, a stacking arrangement for the sheets of copying material, delivery means arranged in the housing within the zone of the stack of sheets of copying material and adapted to remove the top sheet from the said stack, a delivery orifice and a transport path, starting in the housing at the stacking arrangement and supplied by the said delivery means, passing the exposure device and through the developing device and leading from the latter to the delivery orifice of the apparatus, guiding and transport means mounted in walls of the said housing and arranged on the transport path so as to guide the said sheet of copying material through the said transport path, driving means for the transport rollers, a main switch for switching on the transport means, electrical connecting means for the exposure device within the said housing, a switch for switching on the said exposure device, a control device for starting the process of feeding a sheet of copying material and switching on the switch for the exposure device in the housing, the said control device comprising: a control cam roller which is freely rotatably mounted in the housing at the start of the transport path and has a follower cam engaging the transport path and passing therethrough, and a peripheral cam which is offset at an angle of about 150° relative to the said follower cam, the said control cam roller also being equipped with a stepped cam in coaxial arrangement, having a cam step whose end face is directed facing the direction of movement of the copying material when the peripheral steps are on the top, wherein there are provided locking means, mounted pivotably within the said housing and resting with one arm against the said end face, whilst the other arm passes through the transport path for the copying material upstream of the control cam roller, and the unlocking or release is effected, when a sheet of copying material causes the locking device to pivot, wherein the said peripheral cam is located in the engaged position of the locking means so on the stepped surface that it ends in front of the topmost position of the control cam roller as viewed in the sense of rotation thereof, and comprising further a locking roller which is mounted freely rotatably on a linkage, the said linkage being pivotable about a spindle mounted in the housing and guiding the said locking roller movably on the control cam roller in a position which is offset in the direction opposite to the movement of the copying material against the vertical plane passing through the axis of the control cam roller, wherein the locking roller rests, in the position of the control cam roller held by the locking means, against a flank of the peripheral cam and blocks the rotation of the control cam roller in the sense opposite to the movement of the copying material, and wherein a counter-roller is mounted in the housing, located in the vertical through the transport path opposite the control cam roller and adapted to be positively driven, wherein the control cam roller has a flat within the zone of the follower cam which, when set opposite the counterroller, eliminates contact between the same and the control cam roller, but causes after rotation engagement between a peripheral section of the said control cam roller and the driven counterroller, causing the control cam roller to be carried along until the follower cam rests, after a rotation of the control cam roller through less than 360°, on the upper surface of the sheet of copying material, wherein in this position of the control cam roller the flat is with one end again opposite the counterroller, causing the driving engagement to be relieved and the peripheral cam engages under the locking roller by means of another flank of the follower cam designed after the manner of a lifting flank, causing the locking roller to be lifted, which movement of the locking roller releases the exposure device for introducing the original and the charging device to be switched on by means of an arm of the said linkage, whilst the offset of the locking roller against the vertical through the axis of the control cam roller causes, by virtue of the contact pressure of the former against the latter the resetting into the starting position after the copying material has released the follower cam and the locking means have returned into the inoperative position.

2. An apparatus as claimed in claim 1, comprising spring means arranged on the linkage and within the said housing, and urging the locking roller against the control cam roller.

3. An apparatus as claimed in claim 1, wherein the counterroller associated with the control cam roller on the other side of the transport path, is equipped with peripheral recesses through which passes a follower cam.

4. An apparatus as claimed in claim 1, wherein the control cam roller is a disk roller with several parallel disks, of which one disk is provided as control disk at one end thereof and carries the said flat and the peripheral cam, whilst the follower cams are arranged on the other disks in alignment with the flat, wherein also the counterroller is designed as a disk roller with roller disks arranged in pairs, arranged always on either side of a disk of the control cam roller, and wherein the transport path consists of guide surfaces equipped with longitudinally extended perforations allowing the disks of the control cam roller or the follower cam on the one hand, and of the roller disks of the counterroller to pass therethrough.

5. An apparatus as claimed in claim 1, wherein the delivery means comprise a delivery roller freely rotatable in the top of the stacking arrangement, and spring means in the stacking arrangement, adapted to remove the topmost sheet of copying material from the stack to the delivery roller, and comprising further a pair of transport rollers mounted in the housing at the inlet of the transport path of which rollers at least one is driven in the sense of moving the sheet of copying material, and a lever is pivotably mounted in the spindle of a driven transport roller, whilst a slot is provided in a housing wall through which an arm of the said lever passes outside, said arm being equipped with a key, and wherein second spring means are provided arranged in the housing and on the lever, respectively, tending to pull the outwardly extending arm towards the top, and a drive disk is so arranged on the said lever that it engages with its periphery the transport roller, causing it to be entrained by the rotation thereof, and wherein the said drive disk is so located on the lever that a movement of the key towards the bottom presses the driven drive disk against the delivery roller in order to effect delivery of a sheet of copying material and introduction of the said sheet between the transport rollers and into the transport path.

6. An apparatus as claimed in claim 5, wherein the extended arm of the lever has an angled projection affecting the switching means for the exposure device.

7. An apparatus as claimed in claim 5, wherein the movable linkage has a follower lug in the form of a spring, and bearing means are provided in the housing for a locking bar and the said follower lug affects the said locking bar, and wherein the lever has a projection under which the said locking bar engages when the lever is pulled upwards after the key has been released and the movable linkage has been moved by the locking roller on the peripheral cam out of the inoperative position.

8. An apparatus as claimed in claim 1, comprising at least one lock, adjustable in height in front of the feed side of the exposure device so as to prevent in the rest position the supply of an original to the exposure device, and with a supporting linkage between the said lock and the movable linkage, in order to retract the lock from the exposure device when the movable linkage is moved by the vertical movement of the locking roller.

9. An apparatus as claimed in claim 1, wherein the control cam roller has a peripheral length of such dimension that, during the rotation of the control cam roller, from the instant of engagement of the sheet of copying material with the follower cam until it reaches the position in which the locking roller is lifted by the peripheral cam of the control cam roller, the said sheet has been transported with its leading edge to the transparent guide surface which defines one section of the transport path and through which the original is exposed on to the sheet of copying material.

10. In a device for manufacturing copies of an original on to a sheet of copying material, a housing, in the said housing an exposure device for exposing the original on to the sheet of copying material, a developing device for developing the picture exposed in the sheet of copying material, a stack of sheet of copying material, delivery means arranged in the housing within the zone of the storage stack and adapted to remove the top sheet from the stack, a transport path within the housing, starting from the stack of sheets and supplied by the said delivery means, extending past the exposure device and through the developing device, and from there to an outlet orifice in the housing, guide and transport rollers along the transport path and mounted in the housing for guiding the sheet of copying material along the transport path, driving means for the said transport rollers, a main switch for switching on the said transport means, electrical connecting means for the exposure device, a control device for starting the process of supplying a sheet of copying material and switching on the switch for the exposure device, said control device comprising: a pivoting lever rotatably mounted in the housing having one end projecting therefrom and equipped with an operating key, spring means arranged in the housing and urging the said end of the pivoting lever into one limit position, drive transmitting means arranged on the pivoting lever and actuating the said delivery means in order to feed in one sheet of copying material, when the said lever is depressed against the force of the said spring means, control cam roller arrangements, of which one control cam roller engages into the transport path and is carried along by the movement of a sheet of copying material, a peripheral cam on the control cam roller, linkages, arranged movable in the housing and adapted to come into engagement with the peripheral cam in order to release the exposure device and to switch on the light source.

11. An apparatus as claimed in claim 10, wherein the said movable linkages have a resilient coupling member, and a locking bar is movably mounted in the housing and is connected with the said coupling member, wherein the pivoting lever has a lug with which the locking bar cooperates after the movement of the movable linkages in order to lock the pivoting lever after its release so long as the movable linkage is not in its starting position.

12. An apparatus as claimed in claim 11, wherein the pivoting lever has an arm for operating the switching means for the charging device and the movable linkage has a second arm for operating these switching means.

13. An apparatus as claimed in claim 12, wherein the said movable linkage is a carrier for a locking device for the exposure device, said locking device being adapted to be moved out of the locking position by the movable linkage by means of the peripheral cam, in order to release the exposure device.

14. In an apparatus for manufacturing copies of an original on to a sheet of copying material, a housing, comprising an exposure device for exposing an original on to a sheet of copying material, a developing device for developing the picture in the exposed sheet of copying material, a stack of sheets of copying material, delivery means arranged in the operating zone of the said stack and adapted to remove the top sheet therefrom, a transport path arranged within the said housing, starting from the stacking arrangement and supplied by the said delivery means, passing the exposure device and through the developing device to an outlet orifice arranged in the housing, guide and transport rollers mounted in the housing along the transport path for guiding the sheet of copying material through the said transport path, driving means for the said transport rollers, a main switch for switching on the transport means, electrical connecting means for the exposure device, a switch for switching on the charging device, a control device controlling the supply of sheets to the transport path and comprising a control cam roller mounted freely rotatably in the housing, a counterroller, mounted rotatably in the housing and positively driven, said rollers being mounted in opposite relationship on either side of the said transport path and engaging thereinto, a follower cam on the control cam roller, passing through the transport path when the control cam roller is in one position, a control disk on the said control cam roller, having in alignment with the peripheral cam a flat portion, a drive disk on the counterroller adapted to engage the control disk, when the flat has been moved out of the zone of the counterroller by the advancing sheet of copying material impinging on the peripheral cam, causing the control cam roller to be actively driven by the counterroller whilst the leading edge of the sheet of material is relieved, comprising further cams on the control cam roller and movable cam followers in the housing, the said cam followers acting on control means located within the housing, wherein the control cams are arranged on sections of the control cam roller such that they cause the cam followers to move after the control cam roller has come into driving engagement with the counterroller.

References Cited
UNITED STATES PATENTS

| 3,116,923 | 1/1964 | Gunther | 271—51 |
| 3,120,793 | 2/1964 | Baglow et al. | 95—75 XR |
| 3,354,774 | 11/1967 | Smitzer et al. | 88—24 |

NORTON ANSHER, *Primary Examiner.*

CHARLES B. FUNK, *Assistant Examiner.*

U.S. Cl. X.R.

271—37; 88—24